United States Patent
Feder et al.

(10) Patent No.: US 12,432,620 B2
(45) Date of Patent: Sep. 30, 2025

(54) SYSTEMS AND METHODS FOR MULTI-SLICE COMMUNICATION SESSIONS IN A WIRELESS NETWORK

(71) Applicant: Verizon Patent and Licensing Inc., Basking Ridge, NJ (US)

(72) Inventors: Peretz Feder, Englewood, NJ (US); Egemen Kemal Çetinkaya, Hillsborough, NJ (US); Anthony Clay Reynolds, Rhome, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 373 days.

(21) Appl. No.: 18/299,283

(22) Filed: Apr. 12, 2023

(65) Prior Publication Data
US 2024/0349121 A1   Oct. 17, 2024

(51) Int. Cl.
  *H04W 28/12* (2009.01)
  *H04W 40/02* (2009.01)
  *H04W 40/24* (2009.01)

(52) U.S. Cl.
  CPC ........... *H04W 28/12* (2013.01); *H04W 40/02* (2013.01); *H04W 40/24* (2013.01)

(58) Field of Classification Search
  None
  See application file for complete search history.

(56) References Cited

U.S. PATENT DOCUMENTS

| | | | |
|---|---|---|---|
| 11,026,128 B2 * | 6/2021 | Faccin | H04W 36/13 |
| 11,483,801 B2 * | 10/2022 | Zhu | H04W 12/37 |
| 2022/0086938 A1 * | 3/2022 | Qiao | H04W 76/15 |
| 2022/0303869 A1 * | 9/2022 | Paradkar | H04W 76/15 |
| 2023/0397086 A1 * | 12/2023 | Kim | H04W 76/11 |
| 2024/0107383 A1 * | 3/2024 | Faccin | H04W 36/13 |

OTHER PUBLICATIONS

Third Generation Partnership Project, "Technical Specification Group Services and System Aspects; Procedures for the 5G System (5GS); Stage 2 (Release 17)," TS 23.502 V17.6.0 (Sep. 2022).

* cited by examiner

*Primary Examiner* — Brian S Roberts

(57) ABSTRACT

A system described herein may receive a request to associate a protocol data unit ("PDU") session, between a particular User Equipment ("UE") and a network, with multiple network slices. The system may provide the particular PDU session identifier to a first set of network devices that are associated with the first slice, and to a second set of network devices that are associated with the second slice. The network may route first traffic, received from the UE, to the first set of network devices based on the first traffic including the particular PDU session identifier and the identifier of the first network slice. The network may route second traffic, received from the UE, to the second set of network devices based on the second traffic including the particular PDU session identifier and the identifier of the second network slice.

20 Claims, 10 Drawing Sheets

401

| Traffic attributes | Slice | PDU Session |
|---|---|---|
| {Attr_A} | Slice_A | PDU_A |
| {Attr_B} | Slice_B | PDU_A |
| {Attr_C} | Slice_C | PDU_A |
| {Attr_D} | Slice_A | PDU_B |
| {Attr_E} | Slice_A | PDU_C |
| {Attr_F} | Slice_B | PDU_C |

| Slice | Bearer(s) | Tunnel |
|---|---|---|
| Slice_A | Bearer_A, Bearer_D,... | Tunnel_A |
| Slice_B | Bearer_B, Bearer_E,... | Tunnel_B |
| Slice_C | Bearer_C | Tunnel_C |

SYSTEMS AND METHODS FOR MULTI-SLICE COMMUNICATION SESSIONS IN A WIRELESS NETWORK

BACKGROUND

Wireless user equipment ("UE"), such as mobile telephones or other wireless communication devices, may execute applications associated with services such as voice call services, content streaming services, file download services, or the like. A wireless network may provide different Quality of Service ("QoS") treatment to different applications in order to provide a satisfactory user experience for particular applications.

BRIEF DESCRIPTION OF THE DRAWINGS

FIGS. 4 and 5 illustrate example data structures that may be used in accordance with some embodiments;

DETAILED DESCRIPTION OF EXAMPLE EMBODIMENTS

The following detailed description refers to the accompanying drawings. The same reference numbers in different drawings may identify the same or similar elements.

Wireless networks may provide mechanisms whereby different Quality of Service ("QoS") levels are provided to traffic associated with different applications. Such treatment may include the use of particular discrete sets of resources or other QoS parameters associated with a wireless network (e.g., network slices), queuing parameters, resource allocation parameters, and/or other QoS-related parameters in order to provide a threshold measure of performance for the traffic based on the application with which the traffic is associated.

As described herein, some applications may be associated with different services and/or traffic types. For example, a given application may be associated with a voice call service, a video streaming service, and a text messaging service. As such, the application may send and/or receive voice call traffic, video streaming traffic, and/or text traffic to and/or from a network. Embodiments described herein provide mechanisms by which the different traffic types associated with an application may be provided with granular, differentiated QoS treatment based on traffic type (e.g., per-traffic type QoS treatment). In this manner, different traffic types associated with applications may be provided in a manner that provides at least a threshold measure of performance on a per-traffic type basis. Further, some embodiments may utilize one communication session (e.g., one user plane communication session), such as a protocol data unit ("PDU") session, to communicate different traffic types with the network, thus minimizing the amount of setup between a UE and the network for different traffic types. For example, as discussed herein, the same PDU session may be associated with (e.g., may use, may be served by, etc.) multiple different network slices, in order to provide QoS treatment to different traffic types, such as different traffic types associated with the same application executing at the UE.

Figure 1:
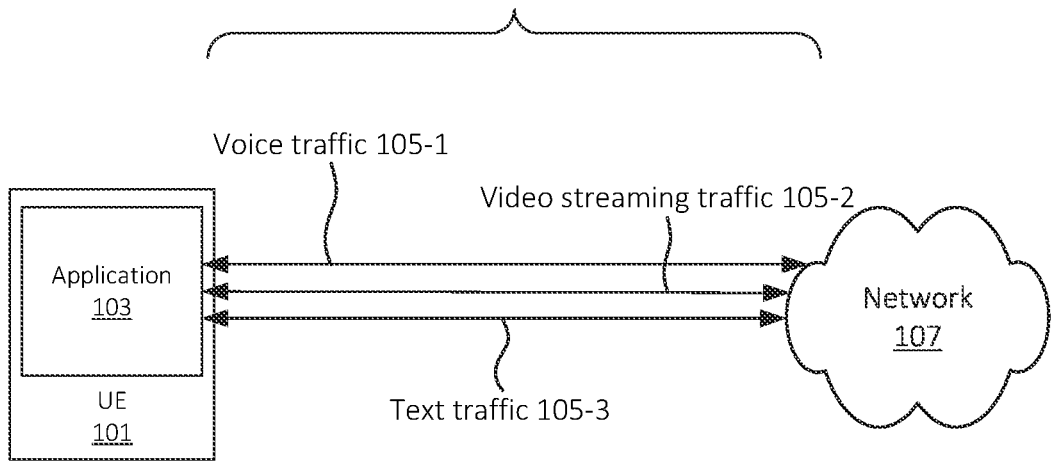
FIG. 1 illustrates a particular application executing at a UE that is associated with multiple different traffic types.

As shown in FIG. 1, for example, UE 101 may execute application 103. In this example, application 103 may provide voice call services, content streaming services, and file transfer (e.g., "download" and/or "upload") services. As such, as described herein, embodiments include providing multiple types of traffic 105 between UE 101 and network 107, where such traffic is associated with application 103 (and/or one or more other applications executing at UE 101). For example, application 103 may send and/or receive voice traffic 105-1, video streaming traffic 105-2, and text traffic 105-3. As noted above, these different traffic types may be associated with different QoS parameters, Service Level Agreements ("SLAs"), performance thresholds, etc. For example, voice traffic may be associated with QoS parameters, SLAs, etc. (referred to herein simply as "QoS parameters" for the sake of brevity) indicating relatively low latency thresholds and relatively low throughput thresholds, video streaming traffic may be associated with QoS parameters indicating relatively low latency thresholds and relatively high throughput thresholds, and text traffic may be associated with QoS parameters indicating relatively high latency thresholds and relatively low throughput thresholds (e.g., "best effort" QoS parameters).

Figure 2:
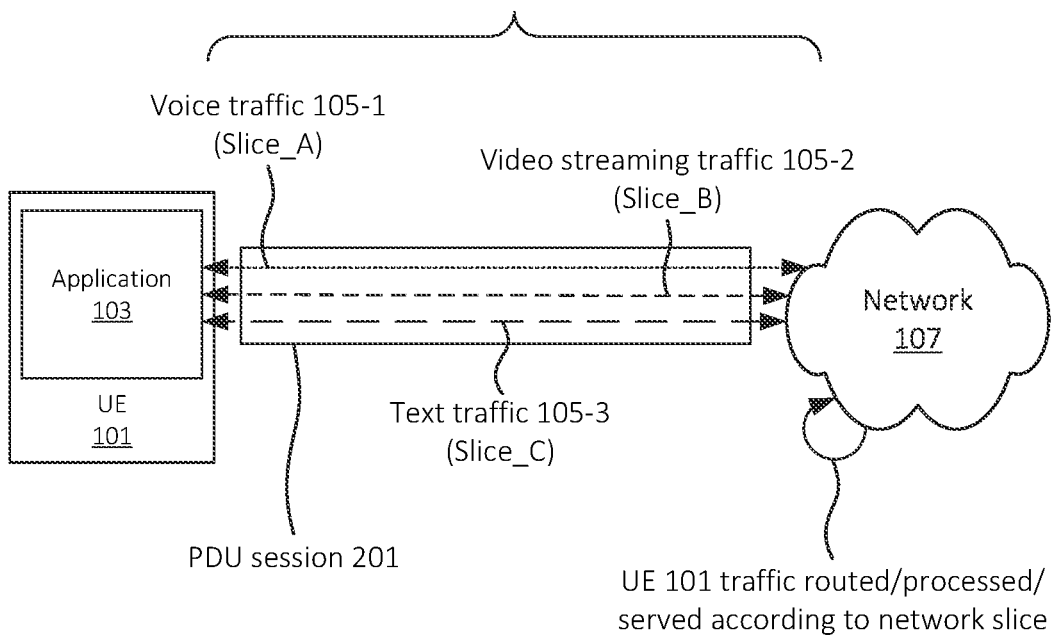
FIGS. 2 and 3 illustrate an example overview of one or more embodiments described herein.

As shown in FIG. 2, in accordance with embodiments described herein, UE 101 may utilize a single communication session (e.g., a single PDU session 201) for the different traffic types associated with application 103. In some embodiments, as discussed herein, PDU session 201 may be associated with, may utilize, may be served by, etc. multiple network slices of network 107. For example, voice traffic 105-1 may be sent or received via PDU session 201, and may be associated with a first network slice (denoted as "Slice_A"). In this example, Slice_A may be a network slice that is capable of delivering QoS parameters associated with voice traffic 105-1 (e.g., relatively low latency), and/or that is otherwise selected based on QoS parameters associated with voice traffic 105-1. For example, UE 101 may identify a UE Route Selection Policy ("URSP") rule or other rule, policy, etc. based on which UE 101 may determine that voice traffic 105-1 should be associated with Slice_A (e.g., as opposed to some other slice of network 107).

Additionally, video streaming traffic 105-2 may also be sent or received via the same PDU session 201, and may be associated with a second network slice (e.g., "Slice_B"). Further, text traffic 105-3 may be sent or received via the same PDU session 201, and may be associated with a third network slice (e.g., "Slice_C"). Network 107 may provide QoS treatment to these various traffic types in accordance with their associated network slices, such as prioritizing traffic associated with certain slices, routing traffic to different network elements associated with different network slices, etc.

Figure 3:
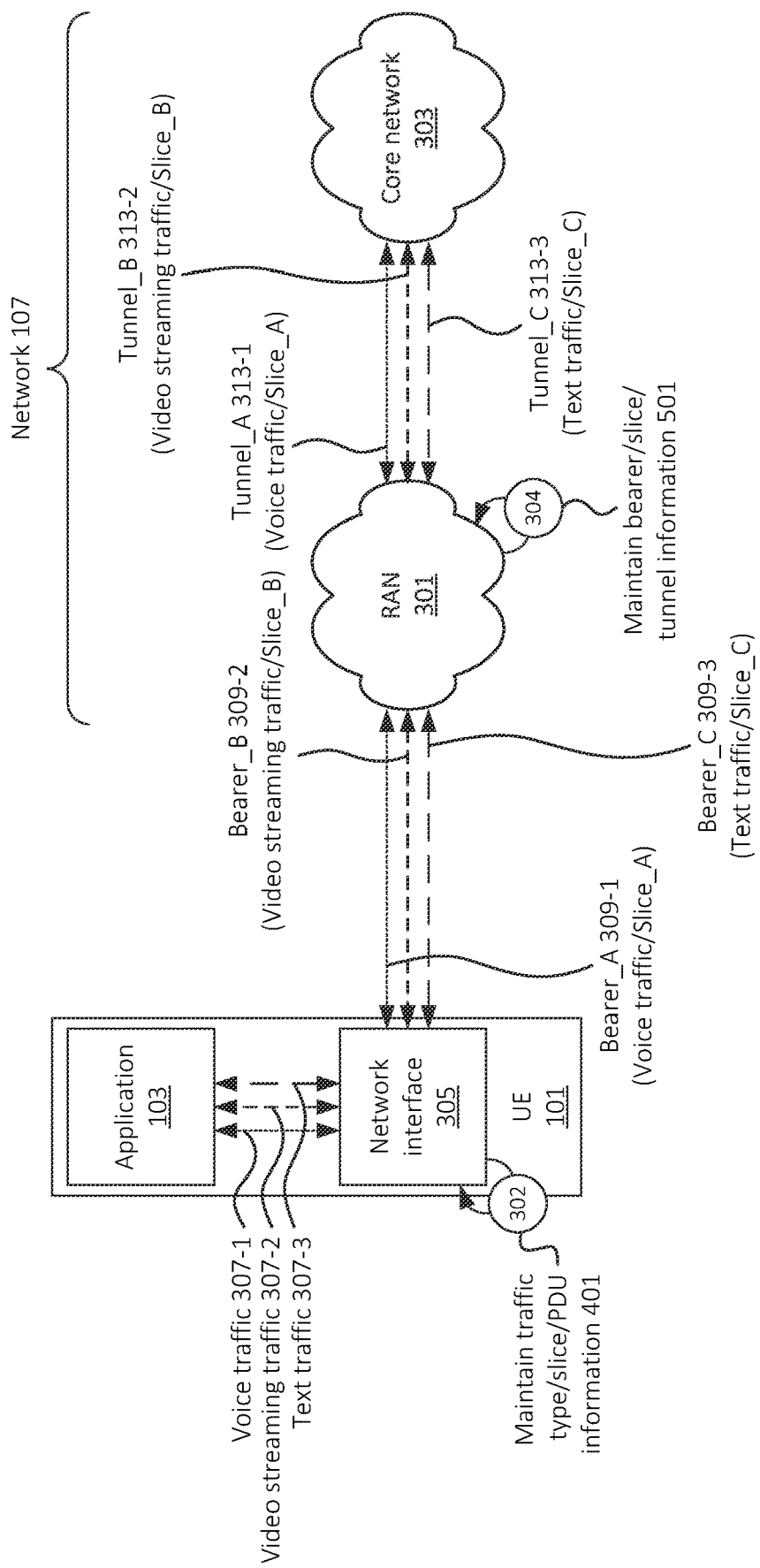

As shown in FIG. 3, UE 101 and/or various portions of network 107 may handle, process, route, etc. traffic associated with different slices in different manners, in order to provide QoS parameters associated with the different slices. For example, as shown, network 107 may include RAN 301 and core network 303. RAN 301 may serve as a wireless interface between UE 101 and core network 303, and core network 303 may provide services such as routing traffic to and/or from UE 101 (e.g., between UE 101 and one or more other UEs, application servers, networks, etc.). UE 101 may include network interface 305, which may include one or more modems, radios, antennas, etc. via which other components of UE 101 (e.g., application 103, an operating system of UE 101, one or more other applications, etc.) may communicate with network 107 and/or portions thereof (e.g., RAN 301 and/or core network 303).

In some embodiments, network interface 305 may receive and/or maintain (at 302) information associating a particular traffic type with a particular network slice. For example, network interface 305 may receive or maintain URSP rules or other suitable rules or policies indicating an association between particular traffic types (e.g., traffic descriptors, traffic attributes, application identifiers, or other suitable information) and particular network slices. In accordance with some embodiments, network interface 305 may further maintain (at 302) information associating particular traffic types and/or network slices with a particular PDU session, which may include associating multiple different traffic types and/or network slices with a particular PDU session. Examples of establishing a PDU session that is associated with multiple traffic types and/or slices are provided below. The information associating the PDU session with multiple traffic types and/or slices (e.g., as referred to above) may be generated or maintained by network interface 305 pursuant to the establishment or configuration of the PDU session with multiple traffic types and/or slices.

FIG. 4 illustrates example data structure 401 that may be maintained (at 302) by network interface 305. As shown, data structure 401 includes information associating particular sets of traffic attributes and slices with particular PDU sessions. The traffic attributes may include traffic descriptors or other attributes, which may be associated with particular traffic types. The traffic attributes may include, for example, traffic signatures, labels, destination Internet Protocol ("IP") addresses, application identifiers, packet sizes, traffic burst intervals, or other identifiable attributes of traffic, based on which particular traffic types may be identified. In the figure, a first set of traffic attributes (e.g., which may be associated with a first traffic type) is denoted as "{Attr_A}," a second set of traffic attributes (e.g., which may be associated with a second traffic type) is denoted as "{Attr_B}," and so on. The slices with which such traffic attributes are associated are denoted as "Slice_A," "Slice_B," and so on, which may represent slice identifiers such as Network Slice Selection Assistance Information ("NSSAI") values or other suitable slice identifiers.

In this example, particular traffic attributes and slices are associated with three different PDU sessions, denoted as "PDU_A," "PDU_B," and "PDU_C." In some embodiments, data structure 401 may include PDU session identifiers or other suitable identifiers. As shown, PDU_B is associated with one particular slice (i.e., Slice_A). That is, this particular PDU session may be used to communicate traffic associated with one slice. On the other hand, PDU_A is associated with three different slices: Slice_A, Slice_B, and Slice_C. As such, PDU_A may be used for different traffic types that are each associated with these different slices (e.g., traffic associated with each respective slice may receive respective QoS treatment from network 107 according to the slice with which such traffic is associated). Similarly, PDU_C may also be associated with multiple slices, such as Slice_A and Slice_B. That is, in some situations, different PDU sessions may be associated with the same slice, such as in situations where one PDU session (e.g., PDU_A) is associated with a first application executing at UE 101, while another PDU session (e.g., PDU_C) is associated with a second application executing at UE 101. In the example shown in FIG. 4, PDU_A and PDU_C may both be associated with Slice_A and Slice_B, such as in situations where a first application associated with PDU_A sends or receives some of the same or similar traffic types as a second application associated with PDU_C.

Returning to FIG. 3, network interface 305 may receive voice traffic 307-1, video streaming traffic 307-2, and text traffic 307-3 from application 103. Additionally, or alternatively, network interface 305 may receive a traffic indication, one or more requests, or other suitable information from application 103 and/or some other suitable source (e.g., an application server or some other external device) indicating that application 103 will send or receive voice traffic 307-1, video streaming traffic 307-2, and text traffic 307-3 via network interface 305. Network interface 305 may accordingly establish, with RAN 301 of network 107, multiple radio bearers 309 that are associated with the different slices (e.g., that are associated with the different traffic types of traffic 307 sent or received by application 103). For example, network interface 305 may utilize URSP rules or other suitable rules or policies to identify that particular traffic types and/or slices are associated with particular RAN QoS parameters (e.g., attributes of bearers between UE 101 and RAN 301, such as 5G QoS Identifier ("5QI") values, QoS Class Identifier ("QCI") values, etc.). As such, each radio bearer 309 may be associated with a different set of RAN QoS parameters, as well as a different slice and/or traffic type.

For example, radio bearer 309-1 (e.g., referred to as "Bearer_A") may be established with a first set of QoS parameters that are identified based on the voice traffic type and/or the associated slice (i.e., Slice_A in this example), radio bearer 309-2 (e.g., referred to as "Bearer_B") may be established with a second set of QoS parameters that are identified based on the video streaming traffic type and/or the associated slice (i.e., Slice_B in this example), and radio bearer 309-3 (e.g., referred to as "Bearer_C") may be established with a set of QoS parameters that are identified based on the text traffic type and/or the associated slice (i.e., Slice_C in this example). In some embodiments, establishing such radio bearers 309 may include UE 101 (e.g., network interface 305) indicating, to RAN 301, the particular network slices with which each particular bearer is associated. In some embodiments, UE 101 (e.g., network interface 305) may request particular RAN QoS parameters based on identifying the network slices associated with respective traffic 307. In some embodiments, RAN 301 may select the particular RAN QoS parameters based on receiving an indication (e.g., from network interface 305) of the respective network slices with which traffic 307 is associated. In some embodiments, RAN 301 may maintain (at 304) information associating particular radio bearers 309 and/or slices to particular core tunnels, communication pathways, serving routers, and/or other network elements (e.g., User Plane Function ("UPFs"), Packet Data Network ("PDN") Gateway ("PGWs"), or other suitable elements) of core network 303. Such information may be used by RAN 301 to select or establish particular radio bearers 309 (e.g., according to particular RAN QoS parameters) with UE 101. Additionally, or alternatively, such information may be used by RAN 301 to select or establish tunnels and/or elements of core network 303 that may be used to communicate traffic associated with particular slices.

FIG. 5 illustrates data structure 501, which may reflect an example of such information. As shown, data structure 501 may indicate that a first set of bearers (e.g., Bearer_A, Bearer_D, and/or one or more other bearers) are associated with Slice_A. Data structure 501 may further indicate that Tunnel_A is associated with Slice_A. Similarly, data structure 501 may indicate that a second set of bearers (e.g., Bearer_B, Bearer_E, and/or one or more other bearers) are associated with Tunnel_B, which is associated with Slice_B. Additionally, data structure 501 may indicate that Bearer_C is associated with Tunnel_C, which is associated with Slice_C.

Returning to FIG. 3, and as noted above, RAN 301 may utilize such information (e.g., as reflected in example data structure 501) to establish respective tunnels and/or otherwise communicate with respective network elements of core network 303 that are associated with particular slices. For example, RAN 301 may utilize a first tunnel 313-1 (e.g., referred to as "Tunnel_A") to communicate traffic associated with Slice_A (e.g., voice traffic 307-1) with core network 303, may utilize a second tunnel 313-2 (e.g., referred to as "Tunnel_B") to communicate traffic associated with Slice_B (e.g., video streaming traffic 307-2) with core network 303, and may utilize a third tunnel 313-3 (e.g., referred to as "Tunnel_C") to communicate traffic associated with Slice_C (e.g., text traffic 307-3) with core network 303. As noted above, and as described in further detail below, some or all of radio bearers 309 and/or tunnels 313 shown in FIG. 3 may be associated with the same PDU session (e.g., a particular PDU session associated with application 103).

Figure 6:
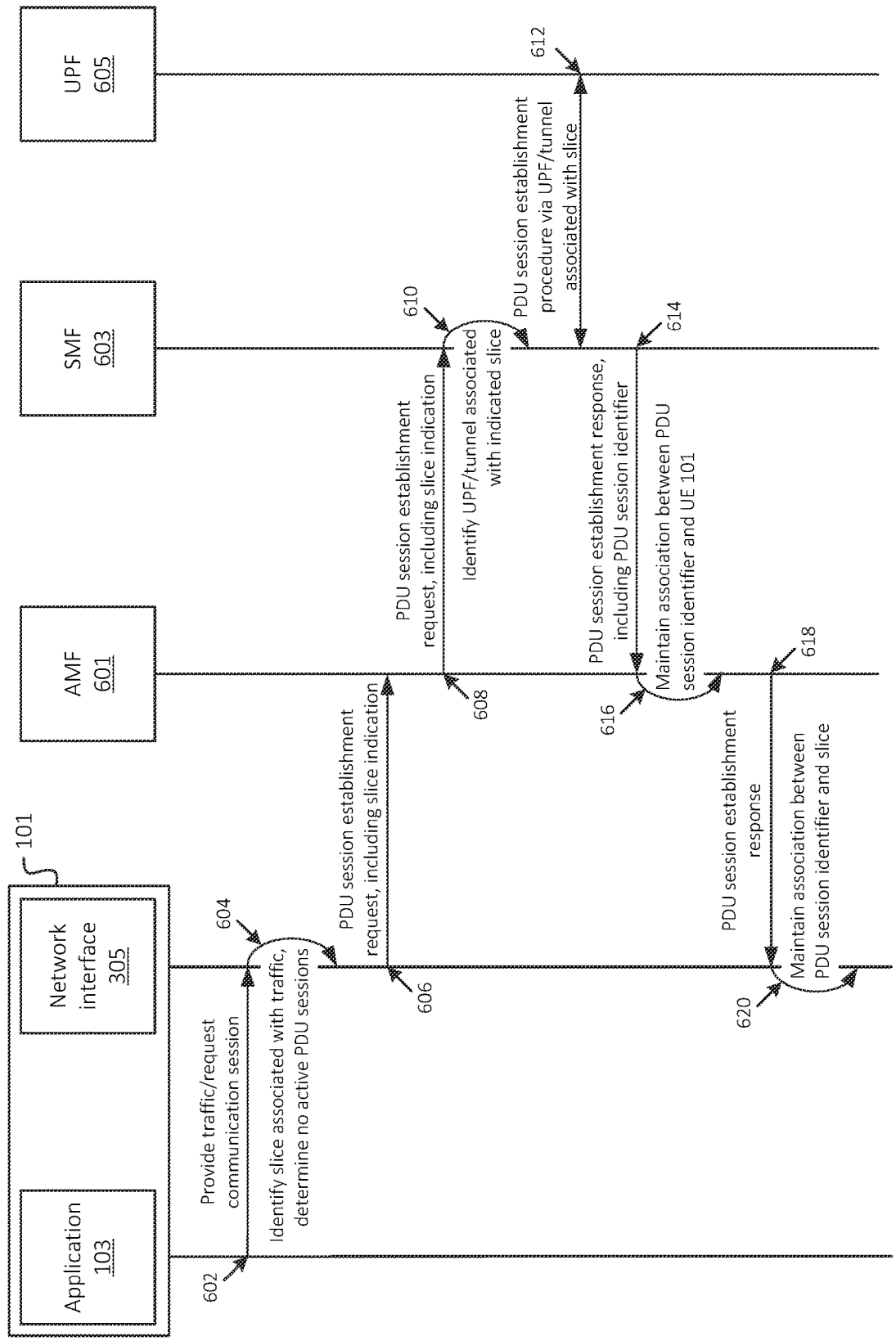
FIGS. 6 and 7 illustrate example signal flows for establishing and/or modifying communication sessions to be associated with multiple network slices, in accordance with some embodiments.

FIG. 6 illustrates an example establishment of a PDU session associated with a particular UE 101. As discussed herein, the established PDU session may be associated with a particular slice, and elements of RAN 301 and/or core network 303 (e.g., Access and Mobility Management Function ("AMF") 601 and/or Session Management Function ("SMF") 603, respectively) may maintain information associating the PDU session with the particular slice. As discussed above, such information may be maintained in data structures similar to and/or otherwise represented by data structure 501. The example shown in FIG. 6 may be associated with a UE-requested PDU session establishment. Similar concepts may apply when the PDU session establishment is requested or initiated by some other network function, device, or system, such as an application function and/or application server that communicates with UE 101.

As shown, a particular application 103 of UE 101 may provide (at 602) particular traffic and/or a request to establish a communication session to network interface 305. The traffic and/or the request may include traffic attributes, traffic descriptors, an identifier of application 103, and/or other suitable information based on which network interface 305 may identify (at 604) a particular slice associated with the traffic or the request. For example, such identification (at 604) may be based on URSP rules or other suitable rules or policies. In some embodiments, the request may include and/or may otherwise be associated with multiple slices. For the sake of simplicity, this example is provided in the context of establishing a PDU session that is associated with one requested slice. In practice, similar concepts may apply when the request indicates multiple slices (e.g., the resulting PDU session may be associated with multiple slices).

In this example, network interface 305 may further identify that there is no active PDU session for application 103. Accordingly, network interface 305 may output (at 606) a PDU session establishment request to AMF 601. The PDU session establishment request may include an indication of the requested slice or slices, such as one or more NSSAI values (e.g., one or more S-NSSAI values) or other suitable identifiers.

Based on receiving the PDU session establishment request (at 606), AMF 601 may perform one or more operations, such as verifying that UE 101 is authorized to use the requested slice, verifying that the requested slice has sufficient capacity to accommodate the requested PDU session, verifying that the slice is supported (e.g., by core network 303, by RAN 301, etc.), determining whether a different AMF 601 serves the requested slice and routing the request to such different AMF 601 in such scenarios, selecting a particular SMF 603 (e.g., a particular SMF instance) based on the requested slice and/or attributes of UE 101, and/or other suitable operations. In some embodiments, in situations where the requested slice is not available or is overloaded (e.g., one or more load metrics of the requested slice are above a particular threshold, the requested slice is not able to provide at least a threshold level of performance or SLAs, etc.), AMF 601 may select a different slice than the requested slice. The different selected slice may be already serving the PDU session or may have to be added to the PDU session through the establishment of an additional tunnel associated with the selected slice. For example, AMF 601 may select a slice that provides a greater measure of performance than the requested slice. In some embodiments, one or more other network functions, devices, or systems may select the slice or may assist AMF 601 in selecting the slice, such as a Network Slice Selection Function ("NSSF") or other suitable network function, device, or system. As another example, AMF 601, an NSSF, and/or other suitable network function, device, or system may select a slice that provides a lesser measure of performance than the requested slice (e.g., in situations where a slice that provides a greater measure of performance is not available or supported, which may provide a better user experience than denying the PDU session establishment request).

As further shown, AMF 601 may output (at 608) a PDU session establishment request to a particular SMF 603. This request may include an indication of the slice requested (at 606) by UE 101, and/or may otherwise include an indication of an alternate slice selected by AMF 601 (e.g., if the requested slice is not supported, is unavailable, is overloaded, etc.). SMF 603 may establish a tunnel with, may identify a previously established tunnel that is associated with the particular slice, and/or may otherwise identify a particular UPF 605 of core network 303 that is associated with the particular slice. For example, different UPFs 605 of core network 303 may be associated with different slices, and SMF 603 may maintain information indicating which UPFs 605 are associated with which respective slices of core network 303. Additionally, or alternatively (e.g., when an alternate slice is selected), SMF 603 may select a particular tunnel (e.g., a particular General Packet Radio Service ("GPRS") Tunneling Protocol ("GTP")-User ("GTP-U") tunnel) that is associated with the alternate slice. For example, particular tunnels for an allowed slice may have been previously established between RAN 301 and/or one or more elements thereof (e.g., one or more base stations, such as evolved Node B ("eNBs"), Next Generation Node B ("gNBs"), etc.) and one or more UPFs 605 of core network 303. SMF 603 may maintain information indicating which tunnels are associated with which network slices. As another example, SMF 603 may establish a new tunnel for the newly requested slice with a selected UPF 605 (e.g., in scenarios where such tunnel has not been previously established).

SMF 603 may use such information to select (at 610) a particular UPF 605 with which the requested PDU session should be established, and/or to select a particular tunnel with which the request PDU session should be associated. SMF 603 may accordingly establish (at 612) the requested PDU session with the identified UPF 605 that is associated with the requested slice (and/or with a particular UPF 605 that is associated with an identified tunnel that is associated with the requested slice). The established PDU session may include a PDU session identifier, and may include or be associated with indications that UE 101 and UPF 605 are endpoints of the PDU session.

SMF 603 may provide (at 614) a PDU session establishment response to AMF 601, including the PDU session identifier. The PDU session establishment response may further include an identifier of UE 101 and/or other suitable information, such as context information based on which AMF 601 may identify that the PDU session establishment response is associated with the PDU session establishment request previously provided (at 608) by AMF 601 on behalf of UE 101.

AMF 601 may maintain (at 616) an association between the PDU session identifier and UE 101 (e.g., a UE context). AMF 601 may further provide (at 618) the PDU session identifier to UE 101 (e.g., to network interface 305). AMF 601 may also indicate, to RAN 301 (e.g., to a particular base station to which UE 101 is connected), that UE 101 is authorized to use the slice. Based on such information, as discussed above, RAN 301 and UE 101 may establish a particular radio bearer 309 that is associated with and is served by the requested slice (e.g., based on data structure 501, as discussed above). Network interface may maintain (at 620) an association between the PDU session identifier and the slice, and potentially with the traffic attributes, descriptors, traffic type, etc. of the traffic (e.g., as discussed above with respect to data structure 401). In some embodiments, network interface 305 may also maintain (at 620) information associating the PDU session with application 103. In this manner, network interface 305 may maintain separate PDU sessions for separate applications executing at UE 101.

Figure 7:
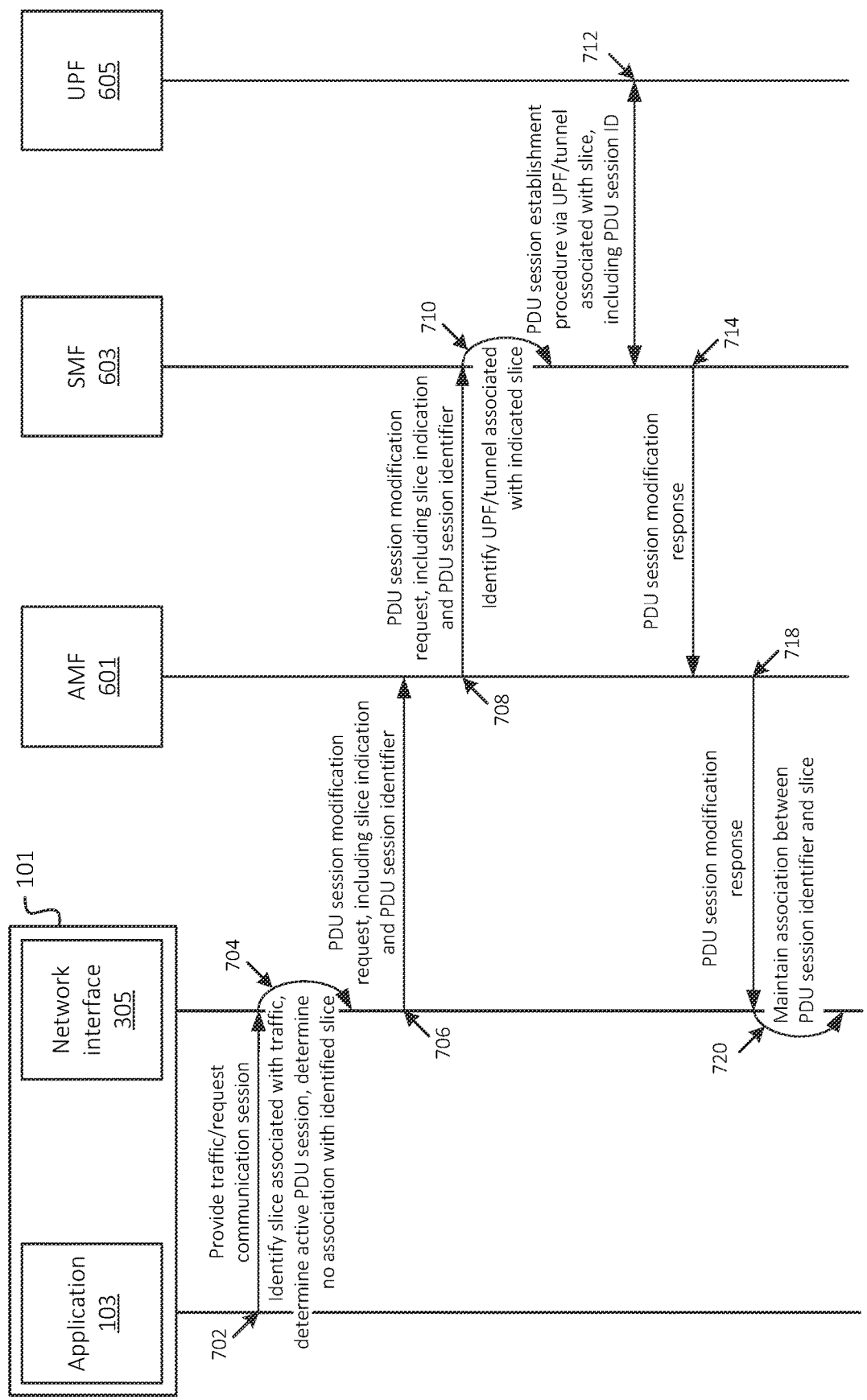

The PDU session established between UE 101 and core network 303 (e.g., as discussed above with respect to FIG. 6) may be associated with multiple network slices (e.g., associated with multiple different traffic types, such as multiple different traffic types associated with the same application 103). For example, as shown in FIG. 7, application 103 may output (at 702) particular traffic and/or may otherwise request a communication session. As similarly discussed above, network interface 305 may identify (at 704) a slice associated with the traffic and/or the request based on traffic attributes and/or other suitable factors. Network interface 305 may further identify that a PDU session is active between UE 101 and core network 303 (e.g., may also identify that the PDU session is associated with application 103). For example, the PDU session may have been previously established according to some or all of the operations shown in FIG. 6 and/or other suitable operations.

Network interface 305 may further identify (at 704) that the previously established PDU session is not associated with the identified (at 704) slice. For example, the traffic or request (at 702) may be associated with a different traffic type, traffic attributes, etc. from a traffic type that is associated with the previously established PDU session. As such, UE 101 (e.g., network interface 305) may output (at 706) a PDU session modification request to AMF 601, including an identifier of the previously established PDU session as well as an indication of the requested slice. In some embodiments, network interface 305 may output (at 706) an indication of all slices for which traffic is to be sent or received by UE 101 (e.g., by application 103). For example, the indication (at 704) may include an identifier of the slice associated with the newly requested (at 702) traffic, as well as one or more identifiers of identifiers of one or more slices that are associated with the existing PDU session. As similarly discussed above, AMF 601 may perform operations such as verifying that UE 101 is authorized to use the requested slice, may select a substitute slice based on various factors, etc.

In accordance with some embodiments, AMF 601 may identify that the indicated PDU session is associated with multiple slices, including the newly requested slice as well as the one or more slices previously associated with the PDU session. For example, AMF 601 may make such an identification based on an indication provided (at 704) by network interface 305, and/or based on UE context information (e.g., as maintained at 616) indicating that UE 101 and/or the indicated PDU session has previously been associated with UE 101 and/or one or more slices. As such, AMF 601 may ultimately determine that the request (at 706) is a request to extend, enhance, modify, etc. the existing PDU session to further be associated with the newly requested slice.

AMF 601 may further output (at 708) a PDU session modification request to SMF 603. The request (at 708) may include the PDU session identifier and an identifier of the requested (at 704) slice. As similarly discussed above, SMF 603 may identify a particular UPF 605 and/or tunnel (e.g., a GTP-U tunnel) that is associated with the requested slice. In some scenarios, UPF 605 (identified at 710) may be a different UPF 605 than is associated with the previously established PDU session. In such instances, SMF 603 may establish a new tunnel that is associated with UPF 605 (identified at 710). In some scenarios, the identified (at 710) UPF 605 may be the same UPF 605 with which the PDU session was previously established, such as in scenarios where UPF 605 serves multiple slices. While similar concepts apply in such scenarios, the examples provided herein are in the context of multiple different UPFs 605.

SMF 603 may accordingly perform (at 712) a PDU session establishment procedure with the identified (at 710) UPF 605. This session establishment procedure may include indicating, to UPF 605, the PDU session identifier that is associated with the previously established PDU session. That is, from the standpoint of UPF 605, a new PDU session may be created between UPF 605 and UE 101. However, from the standpoint of UE 101 and other network elements (e.g., AMF 601 and/or SMF 603), the existing PDU session may be extended, modified, enhanced, etc. to include newly selected (at 710) UPF 605.

Once the PDU session has been extended to include UPF 605, as discussed above, SMF 603 may provide (at 714) a PDU session modification response to AMF 601, which may output (at 718) a session modification response to UE 101 (e.g., network interface 305). In some embodiments, AMF 601 may also notify RAN 301, to which UE 101 is connected, that UE 101 is authorized to utilize the slice, based on which RAN 301 may establish or allow access to one or more bearers that are associated with RAN QoS parameters associated with the indicated slice, as discussed above. Network interface 305 may maintain (at 720) information indicating that the PDU session has been extended to further be associated with the requested slice. As discussed above, such information may be represented by or reflected in data structure 401.

Figure 8:
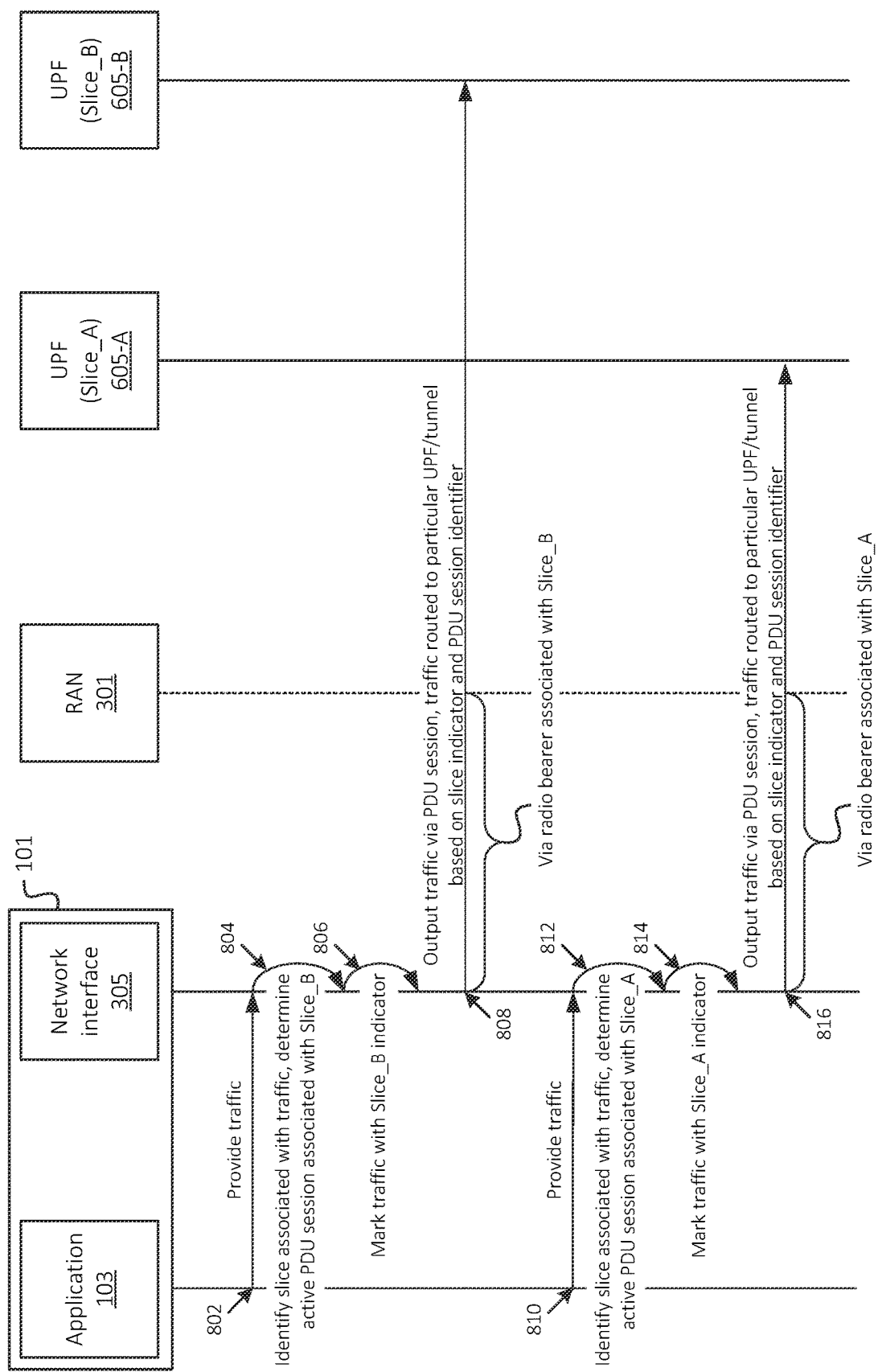
FIG. 8 illustrates example routing of traffic associated with the same communication session according to different network slices, in accordance with some embodiments.

FIG. 8 illustrates an example of how traffic may be handled in accordance with a PDU session that is associated with multiple slices (e.g., multiple different traffic types from the same application 103 of UE 101). As shown, application 103 may output (at 802) traffic (referred to herein as "first traffic"), which may be associated with a first set of attributes, a first set of traffic descriptors, a first traffic type, etc. Additionally, or alternatively, application 103 may output a request to establish a communication session for traffic associated with the first set of attributes, traffic descriptors, etc. While similar concepts may apply for traffic as for a request to establish a communication session, the example provided herein is discussed in the context of outputting traffic, for the sake of simplicity. The traffic (outputted at 802) may include, for example, one or more packets, a stream, etc.

Network interface 305 may identify (at 804) a particular slice associated with the first traffic, based on URSP rules or other suitable rules or policies. For example, network interface 305 may identify attributes, descriptors, etc. of the first traffic and may identify the slice based on comparing such attributes, descriptors, etc. to the URSP rules or other suitable rules or policies. In this example, assume that network interface 305 has identified that the first traffic is associated with a particular slice (e.g., Slice_B). Network interface 305 may mark (at 806) the first traffic, such as by adding header information, encapsulating the first traffic, etc. with an indicator (e.g., an NSSAI value) indicating that the first traffic is associated with Slice_B.

Network interface 305 may also identify (at 804) that the first traffic is associated with a PDU session that has previously been established (e.g., as discussed above with respect to FIGS. 6 and/or 7). As such, network interface 305 may forgo requesting the establishment or modification of a PDU session for the first traffic. Network interface 305 may further identify that the previously established PDU session is associated with the determined slice (i.e., Slice_B, in this example).

Network interface 305 may further output (at 808) the first traffic via the identified PDU session. For example, network interface 305 may include a PDU session identifier of the identified PDU session with the traffic (e.g., may include the PDU session identifier in a header of the first traffic, may set an endpoint of the PDU session as a destination of the first traffic, and/or may otherwise associate the first traffic with the PDU session identifier). In some embodiments, outputting (at 808) the first traffic may include outputting the first traffic to RAN 301 via a particular radio bearer that is associated with the identified slice (e.g., Bearer_B for Slice_B), as discussed above. Elements of core network 303 may receive the first traffic from RAN 301, such as one or more routers, hubs, gateways, etc., and may route the first traffic according to the slice with which the first traffic is associated (i.e., Slice_B, in this example). Additionally, or alternatively, such elements of core network 303 may route the first traffic according to the PDU session identifier with which the first traffic is associated, which may include routing the first traffic to a particular UPF (e.g., UPF 605-B, in this example) with which the particular slice and/or PDU session is/are associated. For example, in some embodiments, such routing elements may use both the slice identifier and the PDU session identifier with which the first traffic is associated (e.g., as indicated in header information or other suitable information associated with the first traffic) to route the first traffic to the particular UPF 605-B with which the particular slice is associated.

As further shown, application 103 may further provide (at 810) second traffic, which may be traffic of a different type, set of attributes, etc. than the first type of traffic. As similarly noted above, network interface 305 may identify (at 812) a different slice associated with the second traffic (e.g., Slice_A), and may further identify that the second traffic is associated with the same PDU session with which the first traffic is associated. For example, based on traffic attributes, an identifier of application 103, and/or other suitable factors, network interface 305 may identify that both the first and second traffic are associated with the same PDU session, but are associated with different network slices. Network interface 305 may accordingly mark (at 814) the second traffic with an indicator or identifier associated with Slice_A, and may output (at 816) the second traffic via the same PDU session as was used for outputting (at 808) the first traffic. Outputting (at 816) the second traffic may include outputting the second traffic via a particular radio bearer (e.g., Bearer_A), that is associated with the first slice, to RAN 301. Elements of core network 303 may route the second traffic based on the slice identifier and/or PDU session identifier associated with the traffic, as similarly discussed above. For example, the second traffic may be routed to a different UPF 605-A, which is associated with Slice_A, than UPF 605-B to which the first traffic was routed. In this manner, embodiments described herein may use the same PDU session identifier for multiple slices and/or traffic types, thus simplifying management of PDU sessions by UE 101 and elements of network 107, while still providing appropriate levels of QoS to different traffic types.

Figure 9:
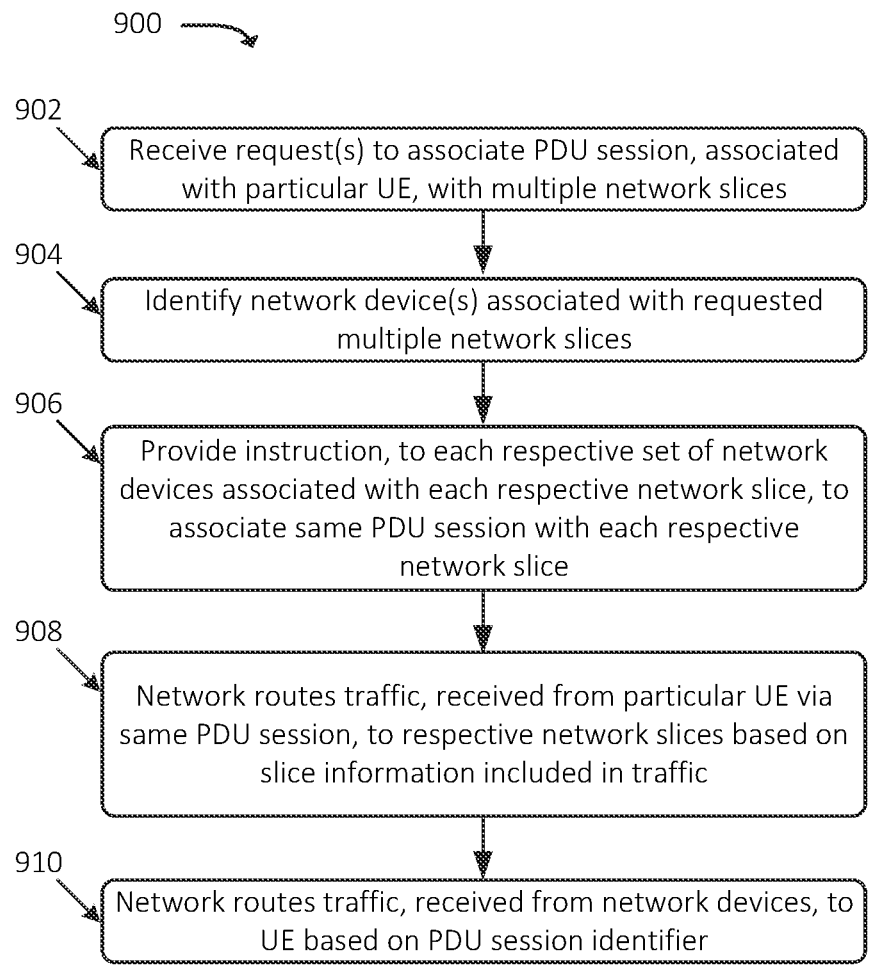
FIG. 9 illustrates an example process for establishing and utilizing a PDU session for traffic that is associated with multiple network slices, in accordance with some embodiments.

FIG. 9 illustrates an example process 900 for establishing and utilizing a PDU session for traffic that is associated with multiple network slices. In some embodiments, some or all of process 900 may be performed by AMF 601. In some embodiments, one or more other devices may perform some or all of process 900 in concert with, and/or in lieu of, AMF 601, such as one or more other elements of core network 303. For the sake of simplicity, process 900 is described as being performed by AMF 601.

As shown, process 900 may include receiving (at 902) one or more requests to associate a PDU session, associated with a particular UE, with multiple network slices. For example, as discussed above, AMF 601 may receive a request from UE 101 to establish a PDU session, where the request specifies a single network slice or multiple network slices. Additionally, or alternatively, AMF 601 may receive a request to extend a previously established PDU session with one or more additional network slices (e.g., in addition to one or more network slices with which the previously established PDU session has previously been associated). In such scenarios, the request to extend the previously established PDU session may include a PDU session identifier of the PDU session to be extended, and/or AMF 601 may identify the PDU session in some other manner (e.g., based on UE context information and/or other suitable information).

Process 900 may further include identifying (at 904) one or more network devices (or sets of network devices) that are associated with the requested network slices. For example, as discussed above, AMF 601 may identify one or more SMFs 603 (e.g., where different SMFs 603 may be associated with different network slices) and/or other suitable network devices or elements of core network 303 that are associated with the requested network slices.

Process 900 may additionally include providing (at 906) one or more instructions, to each respective set of network devices, that are associated with each of the requested network slices, to associate the same PDU session with a respective one of the requested network slices. For example, AMF 601 may provide, to one or more of the identified SMFs 603 that are associated with the different network slices, an instruction to establish a PDU session having the same PDU identifier. Additionally, or alternatively, AMF 601 may provide, to one or more of the identified SMFs 603, a PDU session modification instruction (including the same PDU session identifier). Such SMFs 603 may communicate with other network devices, such as respective UPFs 605 that are associated with multiple network slices, to associate such other network devices with the same PDU session identifier. Thus, as discussed above, from the standpoint of the sets of network devices of the different network slices (e.g., SMFs 603 and/or UPFs 605), each set of network device may be associated with a PDU session via which such set of network devices may communicate with UE 101. Since such PDU sessions are associated with the same PDU session identifier, UE 101 may be able to communicate, via the same PDU session (e.g., using the same PDU session identifier) with network 107 via multiple network slices.

For example, process 900 may include routing (at 908), by one or more network elements of core network 303 (e.g., routers, hubs, switches, gateways, etc. that route traffic to different network slices), traffic that is received from UE 101 to respective network devices (e.g., UPFs 605 or other suitable network devices) based on the network slice information included in the traffic. The respective sets of network devices associated with respective slices (e.g., routers, hubs, gateways, etc.) may further route the traffic to an appropriate destination associated with the network slice, such as a particular UPF 605 with which the PDU session identifier is associated. In this manner, both network slice information as well as a PDU session identifier may be used to route traffic, sent and/or received by core network 303, to an appropriate set of network devices associated with an appropriate network slice. As discussed above, since the PDU session identifier may be the same in such instances, operation of UE 101 may be simplified, inasmuch as UE may be able to use a single PDU session for each application 103, even for different traffic types or to otherwise provide different levels of QoS for traffic associated with each application 103.

Process 900 may further include routing (at 910), by one or more network elements of core network 303, traffic received from respective network devices of respective network slices, to UE 101 based on the PDU session identifier. For example, such network devices may maintain information indicating that the PDU session, associated with the PDU session identifier, is associated with a particular RAN 301 to which UE 101 is connected. As such, traffic associated with multiple network slices, that is destined for UE 101, may be provided to UE 101 via RAN 301. As discussed above, RAN 301 may provide traffic, associated with different network slices, to UE 101 via different bearers that are associated with different RAN QoS parameters.

Figure 10:
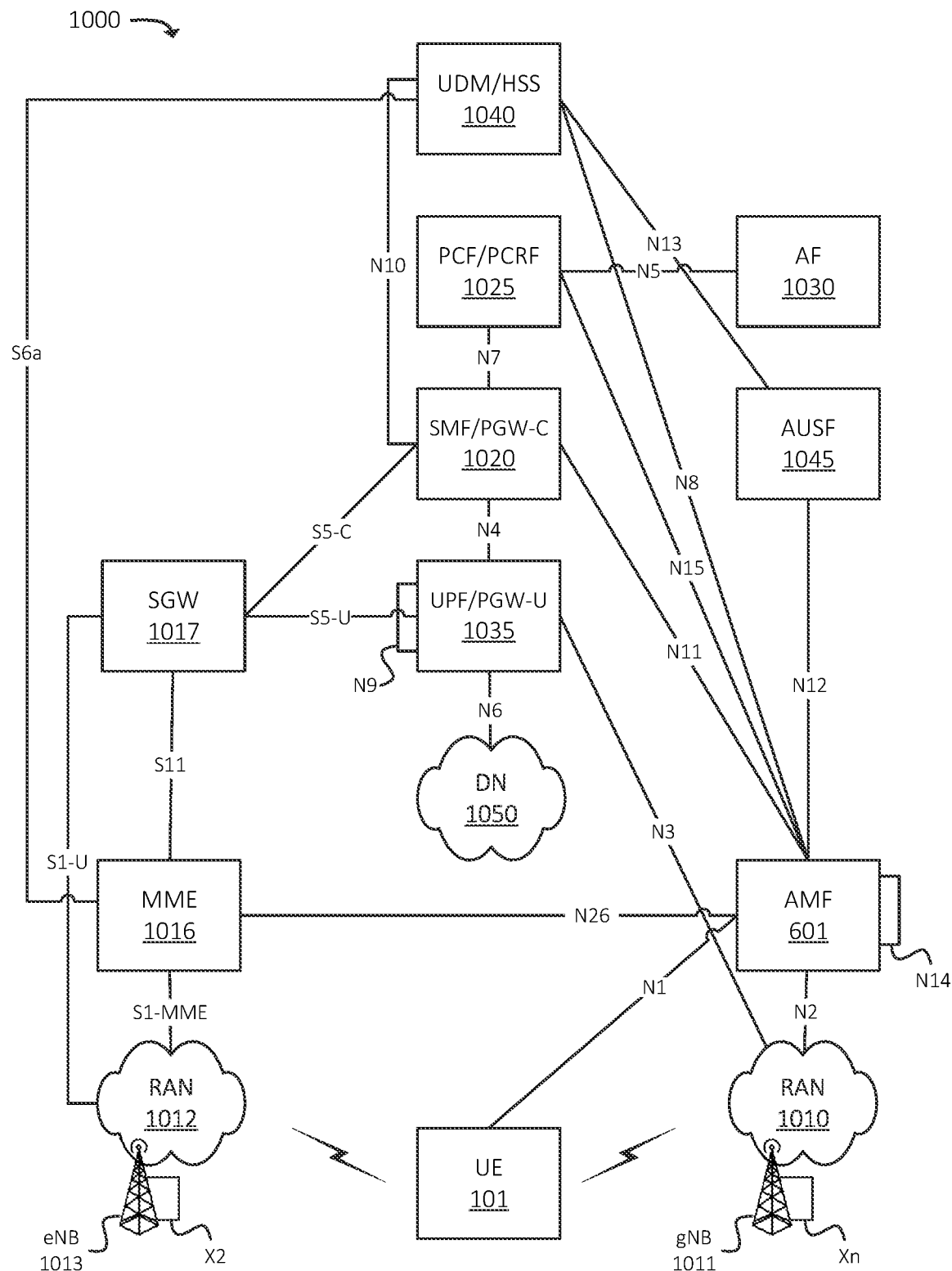
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1000 may represent or may include a 5G core ("5GC"). As shown, environment 1000 may include UE 101, RAN 1010 (which may include one or more Next Generation Node Bs ("gNBs") 1011), RAN 1012 (which may include one or more evolved Node Bs ("eNBs") 1013), and various network functions such as AMF 601, Mobility Management Entity ("MME") 1016, Serving Gateway ("SGW") 1017, SMF/PGW-Control plane function ("PGW-C") 1020, Policy Control Function ("PCF")/Policy Charging and Rules Function ("PCRF") 1025, Application Function ("AF") 1030, UPF/PGW-User plane function ("PGW-U") 1035, Unified Data Management ("UDM")/Home Subscriber Server ("HSS") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050).

The example shown in FIG. 10 illustrates one instance of each network component or function (e.g., one instance of SMF/PGW-C 1020, PCF/PCRF 1025, UPF/PGW-U 1035, UDM/HSS 1040, and/or AUSF 1045). In practice, environment 1000 may include multiple instances of such components or functions. For example, in some embodiments, environment 1000 may include multiple slices of core network 303, where each slice includes a discrete and/or logical set of network functions (e.g., one slice may include a first instance of AMF 601, SMF/PGW-C 1020, PCF/PCRF 1025, and/or UPF/PGW-U 1035, while another slice may include a second instance of AMF 601, SMF/PGW-C 1020, PCF/PCRF 1025, and/or UPF/PGW-U 1035). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. In some implementations, one or more devices of environment 1000 may be physically integrated in, and/or may be physically attached to, one or more other devices of environment 1000. Alternatively, or additionally, one or more of the devices of environment 1000 may perform one or more network functions described as being performed by another one or more of the devices of environment 1000.

Elements of environment 1000 may interconnect with each other and/or other devices via wired connections, wireless connections, or a combination of wired and wireless connections. Examples of interfaces or communication pathways between the elements of environment 1000, as shown in FIG. 10, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 10, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 1000 may be, may include, may be implemented by, and/or may be communicatively coupled to network 107.

UE 101 may include a computation and communication device, such as a wireless mobile communication device that is capable of communicating with RAN 1010, RAN 1012, and/or DN 1050. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 101 may communicate with one or more other elements of environment 1000. UE 101 may communicate with RAN 1010 via an air interface (e.g., as provided by gNB 1011). For instance, RAN 1010 may receive traffic (e.g., user plane traffic such as voice call traffic, data traffic, messaging traffic, etc.) from UE 101 via the air interface, and may communicate the traffic to UPF/PGW-U 1035 and/or one or more other devices or networks. Further, RAN 1010 may receive signaling traffic, control plane traffic, etc. from UE 101 via the air interface, and may communicate such signaling traffic, control plane traffic, etc. to AMF 601 and/or one or more other devices or networks. Additionally, RAN 1010 may receive traffic intended for UE 101 (e.g., from UPF/PGW-U 1035, AMF 601, and/or one or more other devices or networks) and may communicate the traffic to UE 101 via the air interface. In some embodiments, RAN 301 may be, may include, and/or may be implemented by RAN 1010.

RAN 1012 may be, or may include, a LTE RAN that includes one or more base stations (e.g., one or more eNBs 1013), via which UE 101 may communicate with one or more other elements of environment 1000. UE 101 may communicate with RAN 1012 via an air interface (e.g., as provided by eNB 1013). For instance, RAN 1012 may receive traffic (e.g., user plane traffic such as voice call traffic, data traffic, messaging traffic, signaling traffic, etc.) from UE 101 via the air interface, and may communicate the traffic to UPF/PGW-U 1035 (e.g., via SGW 1017) and/or one or more other devices or networks. Further, RAN 1012 may receive signaling traffic, control plane traffic, etc. from UE 101 via the air interface, and may communicate such signaling traffic, control plane traffic, etc. to MME 1016 and/or one or more other devices or networks. Additionally, RAN 1012 may receive traffic intended for UE 101 (e.g., from UPF/PGW-U 1035, MME 1016, SGW 1017, and/or one or more other devices or networks) and may communicate the traffic to UE 101 via the air interface. In some embodiments, RAN 301 may be, may include, and/or may be implemented by RAN 1012.

AMF 601 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, to allow the use of a requested or alternate network slice, manage mobility of UE 101 between RANs 1010 and/or gNBs 1011, and/or to perform other operations. In some embodiments, the 5G network may include multiple AMFs 601, which communicate with each other via the N14 interface (denoted in FIG. 10 by the line marked "N14" originating and terminating at AMF 601).

MME 1016 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1012 and/or eNBs 1013, and/or to perform other operations.

SGW 1017 may include one or more devices, systems, VNFs, CNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, CNFs, etc., that gather, process, store, and/or provide information in a manner described herein. SMF/PGW-C 1020 may, for example, facilitate the establishment of communication sessions on behalf of UE 101. In some embodiments, the establishment of communications sessions may be performed in accordance with one or more policies provided by PCF/PCRF 1025. In some embodiments, SMF 603 may be, may include, and/or may be implemented by SMF/PGW-C 1020.

PCF/PCRF 1025 may include one or more devices, systems, VNFs, CNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, CNFs, etc., that receive, store, and/or provide information that may be used in determining parameters (e.g., quality of service parameters, charging parameters, or the like) for certain applications.

UPF/PGW-U 1035 may include one or more devices, systems, VNFs, CNFs, etc., that receive, store, and/or provide data (e.g., user plane data). For example, UPF/PGW-U 1035 may receive user plane data (e.g., voice call traffic, data traffic, etc.), destined for UE 101, from DN 1050, and may forward the user plane data toward UE 101 (e.g., via RAN 1010, SMF/PGW-C 1020, and/or one or more other devices). In some embodiments, multiple UPFs 1035 may be deployed (e.g., in different geographical locations), and the delivery of content to UE 101 may be coordinated via the N9 interface (e.g., as denoted in FIG. 10 by the line marked "N9" originating and terminating at UPF/PGW-U 1035). Similarly, UPF/PGW-U 1035 may receive traffic from UE 101 (e.g., via RAN 1010, RAN 1012, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035. In some embodiments, UPF 605 may be, may include, and/or may be implemented by UPF/PGW-U 1035.

UDM/HSS 1040 and AUSF 1045 may include one or more devices, systems, VNFs, CNFs, etc., that manage, update, and/or store, in one or more memory devices associated with AUSF 1045 and/or UDM/HSS 1040, profile information associated with a subscriber. AUSF 1045 and/or UDM/HSS 1040 may perform authentication, authorization, and/or accounting operations associated with the subscriber and/or a communication session with UE 101.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 101 may communicate, through DN 1050, with data servers, other UEs 101, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 101 may communicate.

Figure 11:
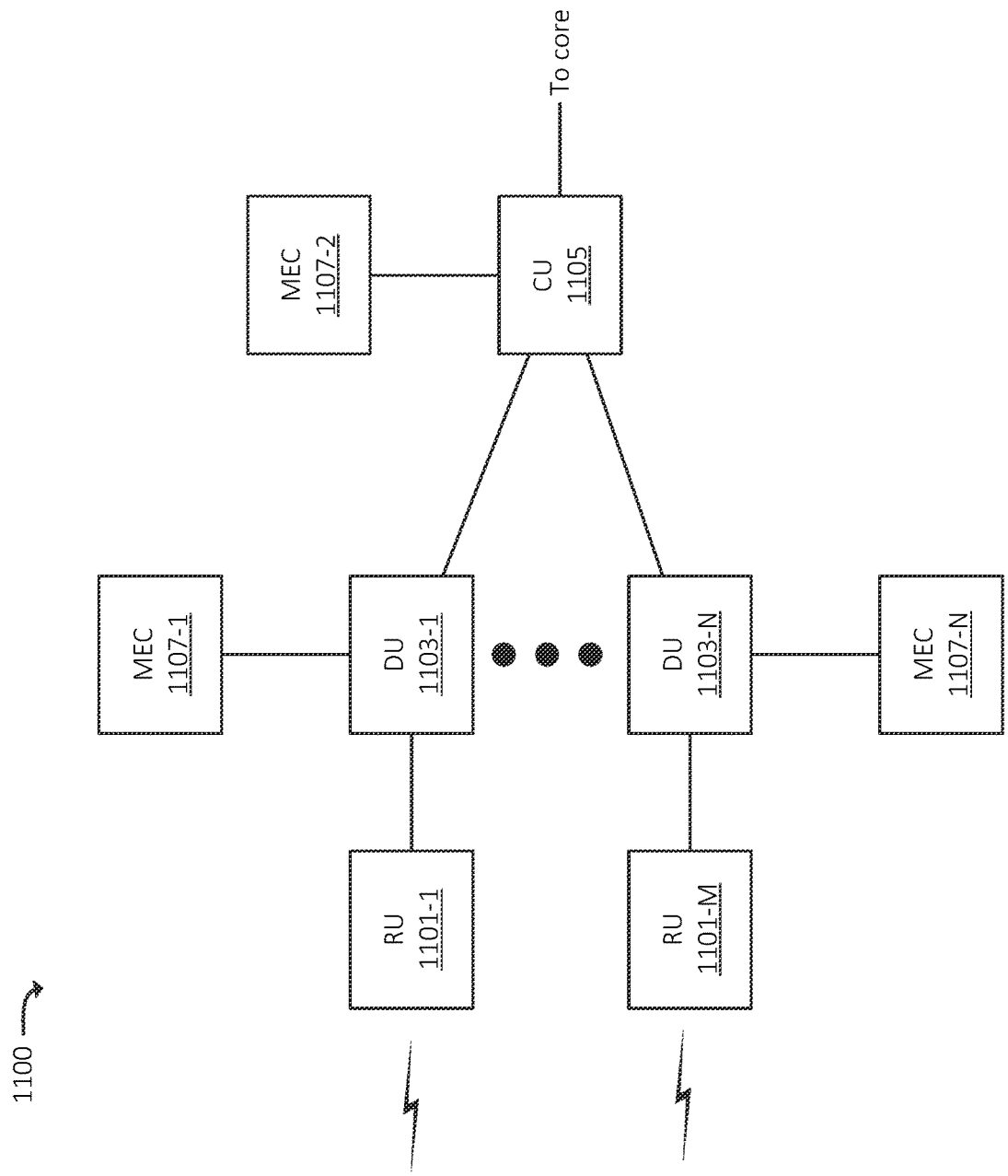
FIG. 11 illustrates an example arrangement of a radio access network ("RAN"), in accordance with some embodiments.

FIG. 11 illustrates an example RAN environment 1100, which may be included in and/or implemented by one or more RANs (e.g., RAN 1010, RAN 1012, or some other RAN). In some embodiments, a particular RAN may include one RAN environment 1100. In some embodiments, a particular RAN may include multiple RAN environments 1100. In some embodiments, RAN environment 1100 may correspond to a particular gNB 1011 of a 5G RAN (e.g., RAN 1010). In some embodiments, RAN environment 1100 may correspond to multiple gNBs 1011. In some embodiments, RAN environment 1100 may correspond to one or more other types of base stations of one or more other types of RANs. As shown, RAN environment 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 601 and/or UPF/PGW-U 1035). In the uplink direction (e.g., for traffic from UEs 101 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 101, and may determine which DU(s) 1103 should receive the downlink traffic. DU 1103 may include one or more devices that transmit traffic between a core network (e.g., via CU 1105) and UE 101 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 101.

RU 1101 may include hardware circuitry (e.g., one or more RF transceivers, antennas, radios, and/or other suitable hardware) to communicate wirelessly (e.g., via an RF interface) with one or more UEs 101, one or more other DUs 1103 (e.g., via RUs 1101 associated with DUs 1103), and/or any other suitable type of device. In the uplink direction, RU 1101 may receive traffic from UE 101 and/or another DU 1103 via the RF interface and may provide the traffic to DU 1103. In the downlink direction, RU 1101 may receive traffic from DU 1103, and may provide the traffic to UE 101 and/or another DU 1103.

One or more elements of RAN environment 1100 may, in some embodiments, be communicatively coupled to one or more Multi-Access/Mobile Edge Computing ("MEC") devices, referred to sometimes herein simply as "MECs" 1107. For example, DU 1103-1 may be communicatively coupled to MEC 1107-1, DU 1103-N may be communicatively coupled to MEC 1107-N, CU 1105 may be communicatively coupled to MEC 1107-2, and so on. MECs 1107 may include hardware resources (e.g., configurable or provisionable hardware resources) that may be configured to provide services and/or otherwise process traffic to and/or from UE 101, via a respective RU 1101.

For example, DU 1103-1 may route some traffic, from UE 101, to MEC 1107-1 instead of to a core network via CU 1105. MEC 1107-1 may process the traffic, perform one or more computations based on the received traffic, and may provide traffic to UE 101 via RU 1101-1. In some embodiments, MEC 1107 may include, and/or may implement, some or all of the functionality described above with respect to AF 1030, UPF 605, and/or one or more other devices, systems, VNFs, CNFs, etc. In this manner, ultra-low latency services may be provided to UE 101, as traffic does not need to traverse DU 1103, CU 1105, links between DU 1103 and CU 1105, and an intervening backhaul network between RAN environment 1100 and the core network.

Figure 12:
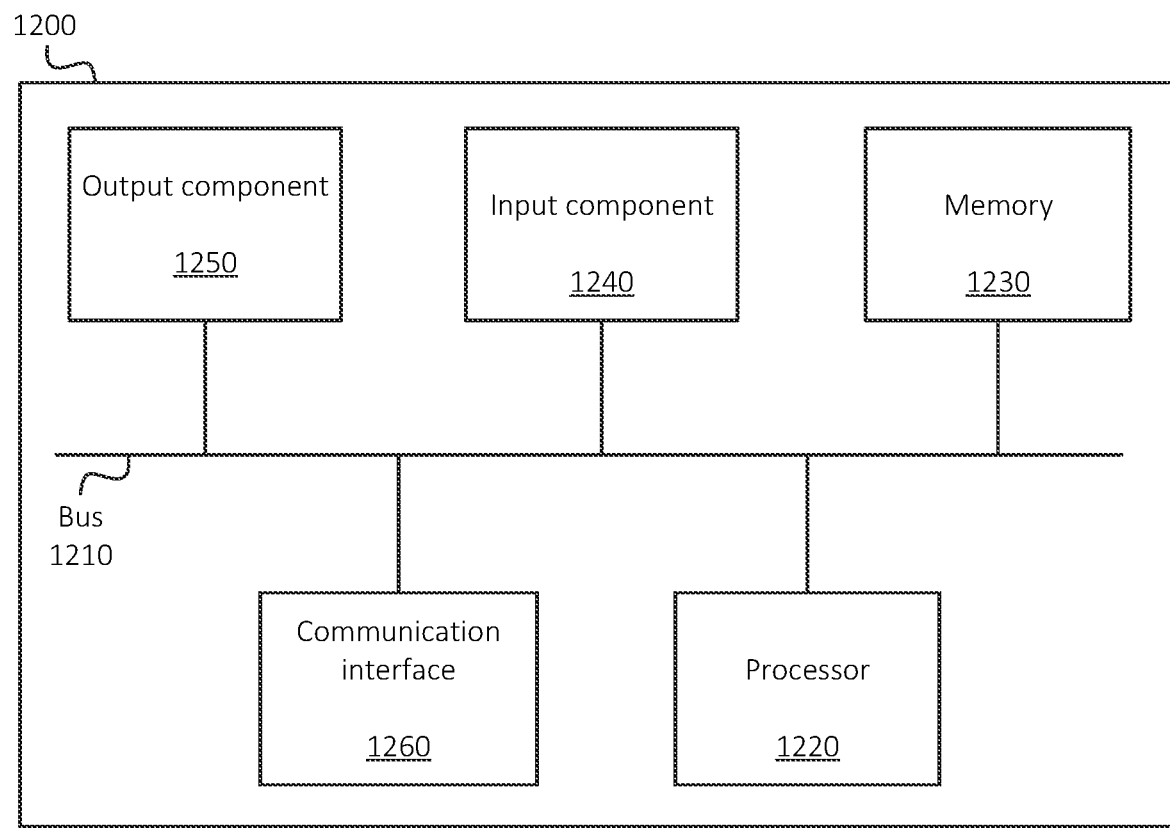
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions (e.g., processor-executable instructions). In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to input component 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing instructions, such as software instructions, processor-executable instructions, etc. stored in a computer-readable medium, such as memory 1230. A computer-readable medium may be defined as a non-transitory memory device. A memory device may include space within a single physical memory device or spread across multiple physical memory devices. The instructions may be read into memory 1230 from another computer-readable medium or from another device. The instructions stored in memory 1230 may be processor-executable instructions that cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive one or more requests to associate a protocol data unit ("PDU") session, between a particular User Equipment ("UE") and a network, with at least a first network slice of the network and a second network slice of the network, wherein the PDU session is associated with a particular PDU session identifier;
provide, to a first set of network devices of the network that are associated with the first slice, the particular PDU session identifier; and
provide, to a second set of network devices of the network that are associated with the second slice, the particular PDU session identifier,
wherein the network receives first traffic from the UE, that includes the particular PDU session identifier and an identifier of the first network slice, and routes the first traffic to the first set of network devices based on the particular PDU session identifier and the identifier of the first network slice, and
wherein the network receives second traffic from the UE, that includes the particular PDU session identifier and an identifier of the second network slice, and routes the second traffic to the second set of network devices based on the particular PDU session identifier and the identifier of the second network slice.

2. The device of claim 1, wherein the first set of network devices output third traffic to the UE based on the particular PDU session identifier, and wherein the second set of network devices output fourth traffic to the UE based on the particular PDU session identifier.

3. The device of claim 2, wherein the UE maintains information associating a particular application, executing at the UE, with the particular PDU session identifier, wherein the UE provides the third and fourth traffic to the particular application based on the information associating the particular application with the particular PDU session identifier.

4. The device of claim 1, wherein the device includes an Access and Mobility Management Function ("AMF") of the network.

5. The device of claim 1, wherein the first traffic is associated with a first set of traffic attributes or a first traffic type, and wherein the second traffic is associated with a second set of traffic attributes or a second traffic type.

6. The device of claim 1, wherein the first network slice is associated with a first set of Quality of Service ("QoS") parameters, and wherein the second network slice is associated with a second set of QoS parameters.

7. The device of claim 1, wherein the first set of network devices includes a first User Plane Function ("UPF") associated with the first network slice, and wherein the second set of network devices includes a second UPF associated with the second network slice.

8. A non-transitory computer-readable medium, storing a plurality of processor-executable instructions to:
receive one or more requests to associate a protocol data unit ("PDU") session, between a particular User Equipment ("UE") and a network, with at least a first network slice of the network and a second network slice of the network, wherein the PDU session is associated with a particular PDU session identifier;
provide, to a first set of network devices of the network that are associated with the first slice, the particular PDU session identifier; and
provide, to a second set of network devices of the network that are associated with the second slice, the particular PDU session identifier,
wherein the network receives first traffic from the UE, that includes the particular PDU session identifier and an identifier of the first network slice, and routes the first traffic to the first set of network devices based on the particular PDU session identifier and the identifier of the first network slice, and
wherein the network receives second traffic from the UE, that includes the particular PDU session identifier and an identifier of the second network slice, and routes the second traffic to the second set of network devices based on the particular PDU session identifier and the identifier of the second network slice.

9. The non-transitory computer-readable medium of claim 8, wherein the first set of network devices output third traffic to the UE based on the particular PDU session identifier, and wherein the second set of network devices output fourth traffic to the UE based on the particular PDU session identifier.

10. The non-transitory computer-readable medium of claim 9, wherein the UE maintains information associating a particular application, executing at the UE, with the particular PDU session identifier, wherein the UE provides the third and fourth traffic to the particular application based on the information associating the particular application with the particular PDU session identifier.

11. The non-transitory computer-readable medium of claim 8, wherein the plurality of processor-executable instructions are executed by an Access and Mobility Management Function ("AMF") of the network.

12. The non-transitory computer-readable medium of claim 8, wherein the first traffic is associated with a first set of traffic attributes or a first traffic type, and wherein the second traffic is associated with a second set of traffic attributes or a second traffic type.

13. The non-transitory computer-readable medium of claim 8, wherein the first network slice is associated with a first set of Quality of Service ("QoS") parameters, and wherein the second network slice is associated with a second set of QoS parameters.

14. The non-transitory computer-readable medium of claim 8, wherein the first set of network devices includes a first User Plane Function ("UPF") associated with the first network slice, and wherein the second set of network devices includes a second UPF associated with the second network slice.

15. A method, comprising:
receiving one or more requests to associate a protocol data unit ("PDU") session, between a particular User Equipment ("UE") and a network, with at least a first network slice of the network and a second network slice of the network, wherein the PDU session is associated with a particular PDU session identifier;
providing, to a first set of network devices of the network that are associated with the first slice, the particular PDU session identifier; and
provide, to a second set of network devices of the network that are associated with the second slice, the particular PDU session identifier,
wherein the network receives first traffic from the UE, that includes the particular PDU session identifier and an identifier of the first network slice, and routes the first traffic to the first set of network devices based on the particular PDU session identifier and the identifier of the first network slice, and wherein the network receives second traffic from the UE, that includes the particular PDU session identifier and an identifier of the second network slice, and routes the second traffic to the second set of network devices based on the particular PDU session identifier and the identifier of the second network slice.

16. The method of claim 15,
wherein the first set of network devices output third traffic to the UE based on the particular PDU session identifier,
wherein the second set of network devices output fourth traffic to the UE based on the particular PDU session identifier,
wherein the UE maintains information associating a particular application, executing at the UE, with the particular PDU session identifier, and
wherein the UE provides the third and fourth traffic to the particular application based on the information associating the particular application with the particular PDU session identifier.

17. The method of claim 15, wherein providing the particular PDU session identifier to the first and second sets of network devices is performed by an Access and Mobility Management Function ("AMF") of the network.

18. The method of claim 15, wherein the first traffic is associated with a first set of traffic attributes or a first traffic type, and wherein the second traffic is associated with a second set of traffic attributes or a second traffic type.

19. The method of claim 15, wherein the first network slice is associated with a first set of Quality of Service ("QoS") parameters, and wherein the second network slice is associated with a second set of QoS parameters.

20. The method of claim 15, wherein the first set of network devices includes a first User Plane Function ("UPF") associated with the first network slice, and wherein the second set of network devices includes a second UPF associated with the second network slice.

* * * * *